United States Patent [19]

Matthews et al.

[11] 4,277,594
[45] Jul. 7, 1981

[54] HEAT SHRINKABLE POLYETHYLENE FILM AND METHOD FOR ITS MANUFACTURE

[75] Inventors: Stephen B. Matthews; Tomas A. Loredo, both of Waynesboro; Walter H. Knox, III; Herman F. Simmons, both of Harrisburg, all of Va.

[73] Assignee: Reynolds Metals Company, Richmond, Va.

[21] Appl. No.: 41,621

[22] Filed: May 23, 1979

[51] Int. Cl.³ .................... C08F 110/02; B29D 9/04; B29D 7/24
[52] U.S. Cl. ................. 526/352; 264/289.6; 264/514; 264/564; 428/36; 428/523; 428/910
[58] Field of Search .................. 264/564, 514, 289.6, 264/290.2; 428/36, 523, 910; 526/352

[56] References Cited

U.S. PATENT DOCUMENTS

| | | |
|---|---|---|
| 2,034,716 | 3/1936 | Dreyfus . |
| 2,334,022 | 11/1943 | Minch . |
| 2,412,187 | 12/1946 | Wiley et al. |
| 2,582,165 | 1/1952 | Rosenfeld . |
| 2,597,877 | 9/1952 | LeClair . |
| 2,618,012 | 11/1952 | Milne . |
| 3,022,543 | 2/1962 | Baird, Jr. et al. |
| 3,076,232 | 2/1963 | Dengler .................... 264/289.6 |
| 3,091,807 | 6/1963 | Turner et al. |
| 3,137,746 | 6/1964 | Seymour et al. .................. 264/73 |
| 3,144,399 | 8/1964 | Rainer et al. ..................... 264/22 |
| 3,177,277 | 4/1965 | Adams et al. ................... 264/210 |
| 3,231,642 | 1/1966 | Goldman et al. ................ 264/569 |
| 3,248,463 | 4/1966 | Wiley et al. ...................... 264/95 |
| 3,248,753 | 5/1966 | Kobayashi et al. ................. 18/1 |
| 3,261,903 | 7/1966 | Carr ............................... 264/289 |
| 3,296,351 | 1/1967 | Rasmussen ..................... 264/289 |
| 3,299,194 | 1/1967 | Golike ............................ 264/210 |
| 3,307,218 | 3/1967 | Reifenhauser .................... 18/14 |
| 3,361,861 | 1/1968 | Bertinotti et al. ................ 264/210 |
| 3,383,445 | 5/1968 | Gebler et al. .................... 264/564 |
| 3,445,886 | 5/1969 | LeMoine et al. ................... 18/1 |
| 3,465,072 | 9/1969 | Gregorian ......................... 264/95 |
| 3,471,606 | 10/1969 | Corbett et al. .................. 264/209 |
| 3,494,993 | 2/1970 | Breidt, Jr. et al. ............... 264/166 |
| 3,548,042 | 12/1970 | Hinrichs ........................... 264/89 |
| 3,568,252 | 3/1971 | Masuda et al. ..................... 18/14 |
| 3,577,497 | 5/1971 | Matsugu et al. ................. 264/564 |
| 3,634,553 | 1/1972 | Foglia et al. ................... 260/897 A |
| 3,659,000 | 4/1972 | Cronk ............................ 264/564 |
| 3,676,539 | 7/1972 | Fisher ............................ 264/173 |
| 3,723,583 | 3/1973 | Hovermale et al. ................ 264/40 |
| 3,891,737 | 6/1975 | Marsh et al. ................... 264/289.6 |
| 3,944,644 | 3/1976 | VanCappellen et al. ........... 264/146 |
| 3,981,149 | 9/1976 | Rice ............................... 60/424 |

Primary Examiner—William R. Dixon, Jr.
Attorney, Agent, or Firm—Glenn, Lyne, Girard & McDonald

[57] ABSTRACT

Described is a mildly biaxially oriented, blown polyethylene film characterized by a cross directional (CD) shrink force in the range of about 60 to 300 psi, an average heat seal energy of at least about 2.0 in - lbs., an average internal tear resistance of at least about 30 gms/ply, and a minimum shrink temperature no higher than 220° F. and which is less than crystalline melt point (or points) of polyethylene material. This film also has a shrink force in the machine direction (MD) which is typically in the range of about 200 to 300 psi.

Also described is the process by which this film is produced.

4 Claims, 4 Drawing Figures

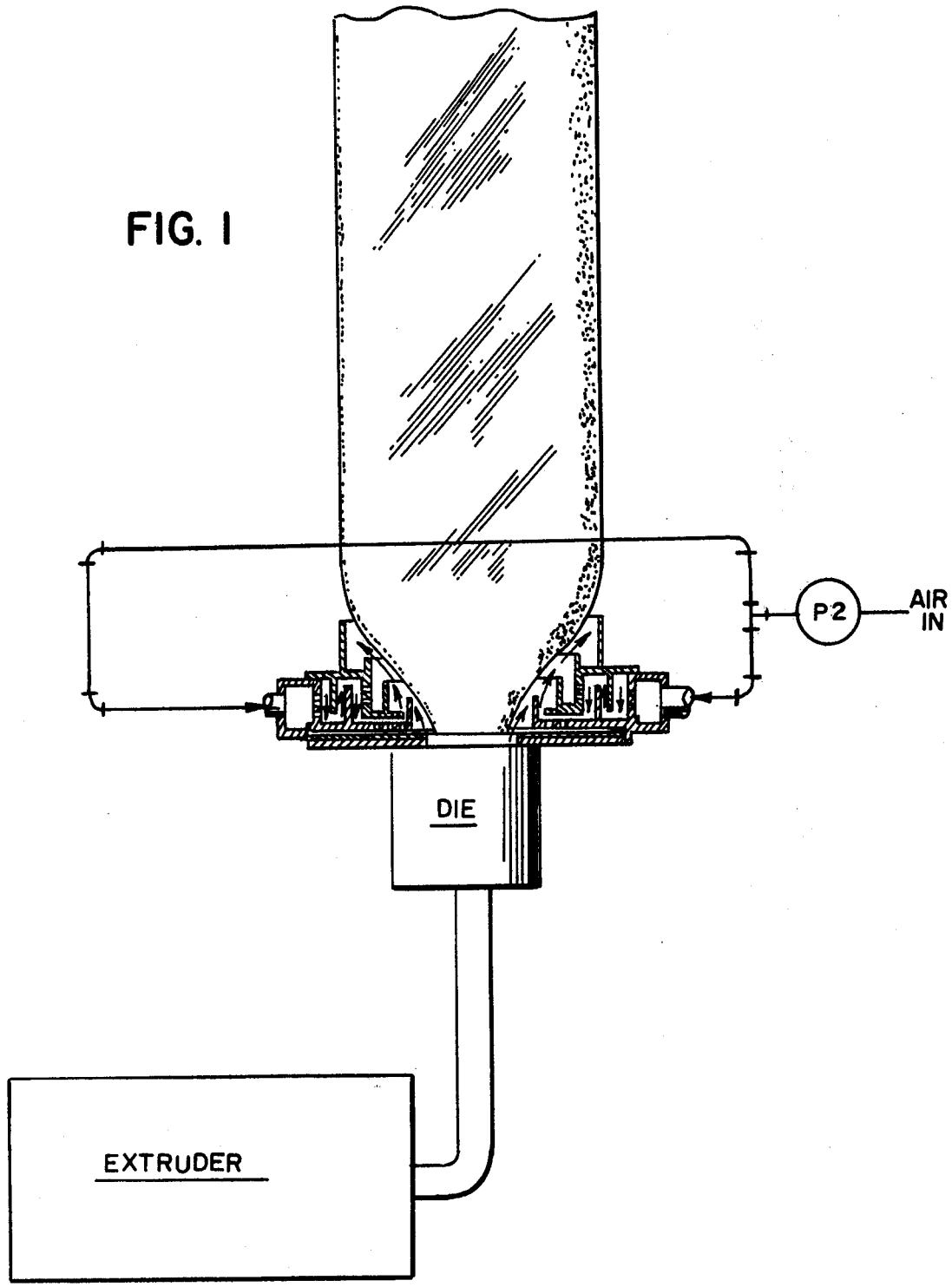

HEAT SHRINKABLE POLYETHYLENE FILM AND METHOD FOR ITS MANUFACTURE

BACKGROUND OF THE INVENTION

This invention relates to polyethylene films, and more particularly, to polyethylene films which are heat-shrinkable.

Polyethylene films have enjoyed common usage as a packaging material, and especially useful are the heat-shrinkable polyethylene films which can be shrunk to conform to the shape of a wrapped article so as to form a skin-like closure.

In a typical packaging operation, an article to be wrapped is situated within a folded section of film. The folded film is then trimmed and its edges are sealed, usually by the application of a hot wire to form a bag or envelope which thus encloses the article. After the bag or envelope is appropriately vented, it is shrunk tightly around the article by applying heat, such as by passing the package along a conveyor through a hot air tunnel.

To be successfully used in this sort of packaging operation, a shrink film must have a variety of characteristic properties.

One important property is shrink force, as determined by ASTM D1504-70. This is the maximum force exerted in a given direction by a unit cross section of oriented film when heat is being applied. It should be distinguished, however, from an analagous and sometimes greater force measurable during the cooling of a first heated section of film.

In the case of blown or extruded films, shrink force is usually measured in the direction of extrusion, known as the machine direction (MD), and in the direction perpendicular to the direction of extrusion, known as the cross direction (CD).

The MD and CD shrink forces should be sufficient in magnitude to enable the film to fully shrink and conform uniformly to the shape of an article with which it is wrapped. And the magnitudes of the MD and CD shrink forces should not be grossly disproportionate to one another or shrinkage of the film may cause it to wrinkle. Also, when packaging a flexible or non-rigid article, such as a thin pad of writing paper or the like, the MD and CD shrink forces should of course be sufficiently moderate to prevent the article from deforming.

Shrink forces are also a factor for purposes of effective trimming and heat sealing by the hot wire method. If, for example, there is little or no shrink force in a direction perpendicular to the wire, the film will not pull away from the wire as it should, and will melt and cause a build up on the wire of film material. Or, where the shrink force is too high in the direction parallel to the wire, the film along the wire will tend to shrink and bunch up.

A second important shrink film property is minimum shrink temperature, i.e. the minimum temperature to which a wrapped article can be heated to achieve a substantially complete shrinkage of the film in conformity with the article's shape. This minimum shrink temperature is of course desirably as low as possible to conserve on energy requirements for the heat shrinking process.

In some polyethylene films, the minimum shrink temperature has been found to exceed the crystalline melt point of the polyethylene material. Where this is the case, a film will tend to wrinkle and get tacky when heated, and sometimes the wrinkled film will stick to itself, and the wrinkles will not be pulled smooth when shrinkage occurs. Hence, it is most critical for a good shrink film to have a minimum shrink temperature which is below the melt point of the film.

Another important shrink film property is internal tear resistance, as determined by ASTM D1922-67. Films having a high tear resistance will have a propensity to resist tearing, and if they are torn or punctured, the tear or puncture will not be readily propagated or enlarged.

Still another important shrink film property is heat seal energy, as determined by using an Instron Integrator Model No. D1-53 (manufactured by the Instron Corporation). Heat seal energy is basically the energy required to cause failure or separation of a heat seal made by the hot wire method. It is an indication of elongation, as well as the applied force, when failure of the heat seal occurs. Packages wrapped with high heat seal energy films have a greater tendency to stay together when bumped or dropped.

In the prior art, polyethylene shrink films can be found which are quite satisfactory in terms of one or more of the important properties discussed above. It is believed, however, that no previous polyethylene shrink film has been known to be completely satisfactory in respect of all of these properties.

Take, for example, polyethylene shrink films conventionally produced by the basic blown bubble method. These films are made simply by first continuously extruding a tube of the molten film material. The extruded tube is then immediately inflated to form a bubble and thereby stretch the film in the cross direction. This blown bubble is then collapsed between a plurality of rollers which draw the film away from the extrusion station at a rate sufficient to stretch the film in the machine direction. Thus, a film which is produced by this method will typically have some MD orientation, and additional MD orientation can readily be imparted, pretty much as desired, by subsequent in-line or off-line stretching operations which are well known in the art.

A typical polyethylene film conventionally produced by the basic blown bubble method will have good strength in terms of internal tear resistance and heat seal energy. However, the film will have little or no CD orientation and a minimum shrink temperature which exceeds its crystalline melt point.

For a crystalline polymer such as polyethylene to be successfully oriented, it must be stretched under tension at elevated temperatures below the polymer's crystalline melt point. At higher temperatures, the film cannot be oriented and previous orientation tends to be neutralized.

As extruded in the conventional blown bubble process, polyethylene is generally at higher than crystalline melt point temperatures, and thus has insufficient tensile strength for shrink energy to be absorbed and retained. When the extruded tube is inflated, the film is cooled and at the same time undergoes CD stretching. Cooling of the film may be accomplished simply by heat transfer to ambient still air, or devices such as air rings may be employed to facilitate cooling. But in any case, CD stretching of the tube tends to occur at those points where the film is weakest, i.e. the hottest, and is generally completed before the film can cool down to orientation temperatures. This explains why conventionally blown polyethylene films typically have little or no CD orientation.

Still, the blown, MD oriented polyethylene films can be given CD orientation, but the ability to do so is limited by the phenomenon called "cold draw". Simply stated, cold draw is the tendency of a film which has been oriented in one direction, e.g. the machine direction, to stretch locally rather than uniformly in the other direction, e.g. the cross direction. That is to say, elongation tends to commence in one or more isolated areas from which further elongation proceeds; and only when stretched far enough does the entire film length become uniform in orientation and thickness. Cold draw is a phenomenon peculiar to crystalline polymers and occurs on stretching at below crystalline melt point temperatures.

One way to deal with the cold draw problem is simply to fully stretch the film until the desired uniformity in CD orientation and gauge has been achieved. However, where this is done the film will inevitably have high CD shrink forces, which are normally on the order of 250 to 500 psi, although values as low as 100 psi have been reported. And for some applications, high shrink forces such as these are not suitable.

Polyethylene films which have been CD stretched through cold draw can be made by a variety of means well known in the art, such as by using a tenter frame or, for example, by the process disclosed in U.S. Pat. No. 3,231,642 to M. Goldman et al. But these films are usually characterized by low strengths in terms of internal tear resistance and heat seal energy, and by relatively high CD shrink forces. Such films are generally excellent in other respects, however, and have good minimum shrink temperature characteristics. Clysar EH (made by E. I. DuPont de Nemours and Company) is an example of a polyethylene shrink film of this type.

As an alternative to stretching the film through cold draw, T. A. Loredo teaches in his U.S. Patent Application Ser. No. 543,998 filed Jan. 24, 1975, now abandoned, that mild CD orientations can be obtained by substantially restraining the expansion of a conventionally extruded tube while cooling the film to its crystalline melt point. After the film has reached this temperature, the tube is allowed to expand while cooling to a temperature about 50° C. below the crystalline melt point (or points). As the means to restrain tube expansion and effect cooling, a special air ring device is disclosed. Films made by this method have been verified to have mild biaxial orientations and high strength in terms of internal tear resistance and heat seal energy. The minimum shrink temperature of these films, however, typically exceeds the polyethylene crystalline melt point, and the extent to which a CD orientation can be imparted is disclosed as being somewhat limited.

Another way that the cold draw problem is dealt with is to alter the characteristics of the polyethylene by providing a crosslinked molecular structure. This can be achieved, for example, by irradiation methods such as those disclosed in U.S. Pat. No. 3,144,399 to W. C. Rainer et al. Irradiated polyethylene has a higher tensile strength at elevated temperatures, and better lends itself to being stretched past the point where cold draw is a problem. Good clarity can often be elusive with irradiated polyethylene, however, and to remove haze a high degree of stretching at orientation temperatures may be required. Consequently, commercial irradiated films, such as Cryovac D-925 made by W. R. Grace & Co., are typically characterized by comparatively high MD and CD shrink forces. Another disadvantage to irradiated biaxially oriented polyethylene films is that they typically have relatively low strength in terms of internal tear resistance and heat seal energy. They do have good minimum shrink temperature properties, however, in the sense that wrinkling in a hot air shrink tunnel is not a problem.

It was against this background that this invention was made.

SUMMARY OF THE INVENTION

This invention provides a special process for producing a blown heat-shrinkable polyethyelene film which comprises the sequential steps of (1) extruding as a continuous tube molten polyethylene which has a crystalline melt point (or points) between about 220° F. and 270° F., (2) expanding the polyethylene tube cross-directionally at a blow ratio between about 3:1 and 8:1 (typically about 5.7:1), (3) drawing the polyethylene film machine-directionally at a draw ratio between about 1.2:1 and 2.8:1 at a temperature between about 160° F. and 230° F., (4) drawing the polyethylene film cross-directionally at a draw ratio between about 1.2:1 and 2.5:1 (typically about 1.4:1 to 1.8:1) at a temperature between about 160° F. and 230° F., but without applying additional heat, (5) relaxing the film so as to allow an MD shrink back between about 0.7:1 and 1.0:1 (typically about 0.7:1 to 0.9:1), (6) heating the polyethylene film to a temperature between about 120° F. and (7) then drawing the polyethylene film machine-directionally at a draw ratio between about 1.1:1 and 1.4:1 to achieve the desired finished film properties.

The polyethylene film which is produced by this process is a biaxially oriented film characterized by a cross directional (CD) shrink force in the range of about 60 to 300 psi, an average heat seal energy of at least about 2.0 inch-pounds, an average internal tear resistance of at least about 30 grams per ply, and a minimum shrink temperature of no higher than about 220° F. and which is less than the crystalline melt point (or points) of the film material. The film also has a shrink force in the machine direction (MD) which is typically in the range of about 200 to 300 psi.

Hence this invention further provides a special blown, non-irradiated polyethylene shrink film which can be adapted for packaging easily deformable articles, which can be shrunk without wrinkling and at comparatively low temperatures, and which has a good strength in terms of internal tear resistance and heat seal energy.

With regard to the process of this invention, one of its more surprising advantages is that it becomes possible to biaxially orient polyethylene films and obtain MD and CD shrink forces over fairly broad ranges without encountering extreme difficulties normally introduced by the cold draw phenomenon.

BRIEF DESCRIPTION OF THE DRAWINGS

In the appended drawings,

FIG. 1 is a schematic view partly in cross section, showing an extrusion die and air-ring assembly adapted for carrying out initial steps of the process of this invention;

DESCRIPTION OF PREFERRED EMBODIMENTS

Figure 4:
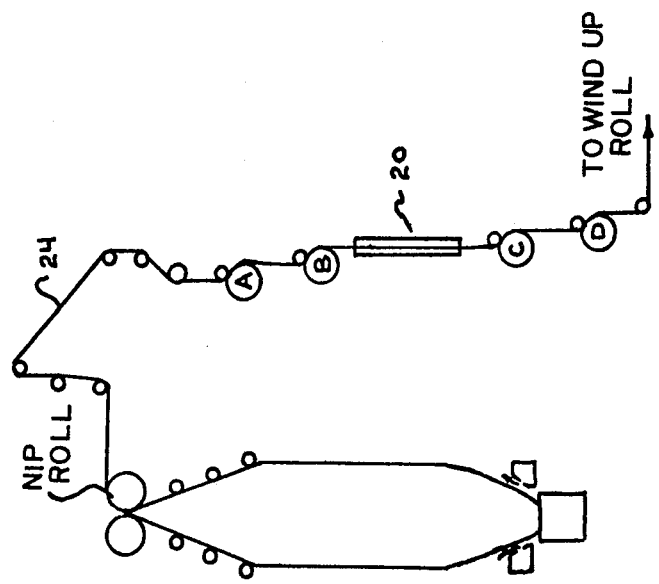
FIG. 4 is a schematic side view of the transverse stretcher assembly shown in FIG. 2, shown in relation to A, B, C and D roller assemblies for carrying out the process of this invention.

In accordance with this invention, a special process is provided which comprises the sequential steps of (1) extruding as a continuous tube, molten polyethylene which has a crystalline melt point (or points) between about 220° F. and 270° F., (2) expanding the polyethylene tube cross-directionally at a blow ratio between about 3:1 and 8:1, (typically about 5.7:1), (3) drawing the polyethylene film machine-directionally at a draw ratio between about 1.2:1 and 2.8:1 at a temperature between about 160° F. and 230° F., (4) drawing the polyethylene film cross-directionally at a draw ratio between about 1.2:1 and 2.5:1 (typically about 1.4:1 to 1.8:1) at a temperature between about 160° F. and 230° F., but without applying additional heat, (5) relaxing the film so as to allow an MD shrink back between about 0.7:1 and 1.0:1 (typically about 0.7:1 to 0.9:1), (6) heating the polyethylene film to a temperature between about 120° F. and 230° F. and (7) then drawing the polyethylene film machine directionally at a draw ratio between about 1.1:1 and 1.4:1 to achieve the desired finished film properties.

As employed herein, the term "machine-direction" is equivalent to the terms "longitudinal" and "linear" direction, and the term "cross-direction" is equivalent to the terms "transverse" and "radial" direction, as the terms are conventionally used in reference to the biaxial orientation of a thermoplastic film.

The term "crystalline melt point," as used in reference to a homogenous polyethylene material, refers to the temperature at which the crystallites of the material first become no longer detectable by X-ray examination as the solid material is heated until it melts, it being understood that a polyethylene blend or mixture will typically have more than one crystalline melt point, i.e there being a distinct crystalline melt point for each constituent of the blend or mixture.

In the above-defined process, the first two of the sequential steps can be accomplished by any suitable extruder die and air-ring device used for the blown bubble method of producing thermoplastic films. Such devices, as illustrated for example in FIG. 1, are well-known in the prior art.

In a typical in-line operation which is now preferred, the extruded film bubble passes through a collapsing station where it is drawn through a pair of nip rollers to produce a layflat film. The layflat film is then passed from the nip rollers directly on to a pair of heated A rolls which are maintained at a temperature of between about 160° F. and 230° F. To maintain the film under tension between the nip roller and the A rolls, the film can be machine-directionally stretched between these two stations at a draw ratio of about 1.07 to 1. The film is then passed from the A rolls to a pair of heated B rolls which are operated at about the same temperature as the A rolls. Between the A rolls and the B rolls, the film is stretched machine-directionally at a draw ratio between about 1.2:1 and 2.8:1.

The polyethylene film exits from the step (3) zone in the process and is passed to a transverse stretcher assembly for the cross-directional stretching procedure of step (4) of the process. In this stretcher assembly, the polyethylene film is drawn cross-directionally at a draw ratio between about 1.2:1 and 2.5:1 at a film temperature between about 160° F. and 230° F.

The polyethylene film from step (4) exits the transverse stretcher assembly and is passed to a pair of slow moving C rolls which are operated at a temperature between about 120° F. and 230° F. Between the transverse stretcher assembly and the C rolls, the film is allowed to relax so as to obtain an MD shrink back between about 0.7:1 and 1.0:1, e.g. about 0.8:1, typically resulting in a CD shrink back (necking) of approximately 15 to 25%. The film is then passed from the C rolls to a pair of D rolls which are water cooled to a temperature of about 60° F. to 65° F. On completion of process step (6), the film is machine-directionally stretched between the C rolls and the D rolls at a draw ratio between about 1.1:1 and 1.4:1. The processed film is then passed to a wind up assembly to achieve a tightly wound roll of film.

Process steps (3)–(7) can of course also be carried out separately from steps (1) and (2) in an off-line operation, if desired.

In accordance with this invention's process, the film may be produced as a two ply laminate by passing the film from the D rolls directly to the wind up assembly; or it can be produced as a single ply film by slitting off the edges of the film and separating its two webs as the film leaves the D rolls, and then winding up each web as a separate roll. Where the two ply film is made, the A and B roll temperatures at the higher end of the stated ranges, e.g. at about 220° F., should be used to achieve good lamination. For single ply film lower temperatures are used, e.g. at about 190° F., whereby lamination is avoided.

Where use is made of the draw ratios at the higher end of the stated ranges for process steps (3) and (4), it is desirable to use the higher A and B roll temperatures to ensure smooth running of the process. Hence, the higher draw ratios will typically be associated with the production of the two ply film. Similarly, the lower draw ratio will typically be used when the single ply film is made.

In accordance with another embodiment of this invention's process, the film may be given two or more passes through the assembly comprising the A, B, C and D rolls and the transverse stretching apparatus. By providing the extra passes, tensile properties, percentage shrink and shrink force can be typically increased somewhat, and for high density polyethylene, haze can be improved.

Figure 2:
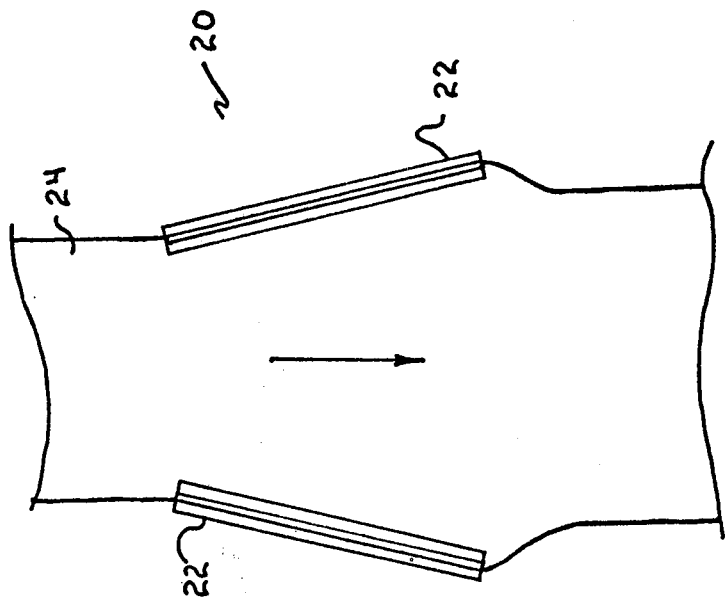
FIG. 2 is a schematic front view of a transverse stretcher assembly adapted for carrying out an intermediate step in the process of this invention.
Figure 3:
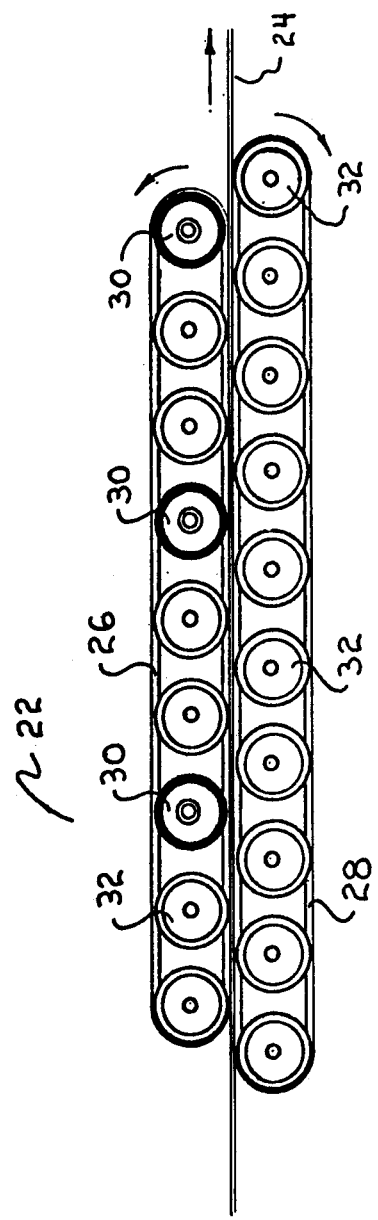
FIG. 3 is a schematic side view of the transverse stretcher assembly shown in FIG. 2.

A transverse stretcher assembly 20, which is particularly suited for the execution of the process step (4), is illustrated schematically in FIGS. 2 and 3. This assembly 20 comprises two opposed edge gripping units 22 which grip opposite edges of the layflat film 24 and direct such edges along diverging paths to impart the desired CD stretch.

As shown in FIG. 3, each gripping unit 22 comprises a pair of opposed endless belts 26 and 28 which mesh together to grip the film 24. The belts 26 and 28 are driven by three driven wheels 30, and are pressed against the film 24 by means of a plurality of idle wheels 32 to exert a sufficient gripping pressure against the film edges, e.g., about 50 to 250 psi, and to maintain the belts 26 and 28 under a sufficient degree of tension. The belts 26 and 28 can be made of any suitable materials, such as rubber, but urethane is presently preferred because of its resistance to heat. Multiply grooved urethane V-belts have worked satisfactorily for the belts 26 and 28, for example. And a ⅞ inch wide urethane V-belt 26 with a single, large channel-like groove and a ½ inch diameter round urethane belt 28 (which interfitted with this channel-like groove) have also given satisfactory results. It should be understood, however, that the edge gripping units 22 may comprise any film edge gripping means, such as for example are found on well-known prior art tenter frame assemblies.

FIG. 3 shows the stretcher assembly 20 in relation to the A, B, C and D rolls for carrying out steps (3) through (7) of the process. As the film 24 is passed from the B roll to the C roll through the stretcher assembly 20, the film 20 is not heated and its temperature may drop slightly, e.g. by about 30° F.

The following examples should serve to further illustrate the process and the film product of such process as provided by this invention.

EXAMPLE 1

In one exemplary practice of the present invention's process, a blown bubble apparatus was employed, as illustrated in FIG. 1, to produce a single ply film.

The presently preferred film composition, a mixture of Tenite 1810 (a low density polyethylene manufactured by Eastman Chemical Products, Inc.) at a 3:1 ratio by weight with X0-61500.42 (a linear low density polyethylene copolymer made by the Dow Chemical Company) plus 900 ppm each of erucamide and diotomaceous silica (in the form of Superfloss, an antiblock additive manufactured by Johns Manville Products Corp.), was extruded at a melt temperature of about 420° F. and an output rate of about 77 pounds per hour on a 2½ inch pilot extruder with a 4-inch die having a 60 mil gap. The tube pressure was maintained at about 0.4 inches of water. Air was forced into the air-ring assembly at a temperature of about 21° C.

The overall blow up ratio of the tube was about 5.7 to 1 yielding a tube layflat of about 36 inches.

The tube was then collapsed by passage through a nip roll stand assembly and stretched between the nip rolls and the A rolls at a draw ratio of about 1.07 to 1 to maintain operating tension. The layflat polyethylene film was then stretched between A and B rolls in the machine-direction at a draw ratio of 1.28 to 1, at A and B roll temperatures of about 190° F.

The film was then CD stretched, using a transverse stretcher assembly, at a draw ratio of about 1.41 to 1 with no additional heat applied. As the film exited the transverse stretcher assembly it was allowed to shrink back about 18% MD before passing through the C rolls (resulting in a neck in about 18% CD).

Then, the polyethylene film was heated to a temperature of about 190° F. by the C rolls and MD stretched in between the C and D rolls at a draw ratio of about 1.32 to 1. The edges of the film were then slit and the two webs separated, yielding two rolls of a single ply, present invention heat shrinkable mildly biaxially oriented polyethylene film. The polyethylene film thus produced had nominal properties as tabulated below.

| (1) | Gauge (mils × 100) | | 75 |
|---|---|---|---|
| (2) | Tensile Strength | MD | 4,700 |
| | at Break (psi) | CD | 3,800 |
| (3) | % Elongation | MD | 360 |
| | at Break | CD | 410 |
| (4) | Yield Strength | MD | 2,700 |
| | (psi) | CD | 2,000 |
| (5) | Tensile Modulus (psi) | MD | 33,000 |
| | | CD | 36,000 |
| (6) | % Haze | | 4.4 |
| (7) | % Shrink 150° F. | MD | 7 |
| | | CD | 3 |
| | 220° F. | MD | 20 |
| | | CD | 15 |
| (8) | Shrinkforce | MD | 240 |
| | (psi) | CD | 90 |
| (9) | % Gloss | | 69 |
| (10) | Lap Seal Range (°F.) | | 227–242 |
| (11) | Weldotron "L" Seal | | |
| | Range (% Line Voltage) | | 50–100 |
| (12) | L Seal Strength (lbs.) | MD | 3.5 |
| | | CD | 2.8 |
| (13) | "L" Seal Energy | | |
| | (in-lbs.) | MD | 4.1 |
| | | CD | 3.6 |
| (14) | Internal Tear Resistance | MD | 25 |
| | (gms/ply) | CD | 66 |
| (15) | Impact Resistance (cm-kg) | | |
| | a - 72° F. | | 5.7 |
| | b - 32° F. | | 5.0 |
| | c - 0° F. | | 4.9 |
| (16) | MVTR (gms/100 in² - 24 hrs. @ 100° F. and 90% RH) | | 0.8 |
| (17) | Coefficient of Friction | | |
| | Static Out | | 0.18 |
| | In | | 0.11 |
| | Kinetic Out | | 0.27 |
| | In | | 0.20 |

EXAMPLE 2

In this example, the process was carried out essentially as in EXAMPLE 1 except that a two ply laminate film was produced. The A and B rolls were operated at 220° F. and the C and D rolls at 190° F. and about 65° F. respectively. MD stretching was at a draw ratio of about 2.66 to 1 between the A and B rolls, about 1.10 to 1 between the B roll and the transverse stretcher, and about 1.15 to 1 between the C and D rolls, with about a 26% MD shrinkback between the transverse stretcher and the C roll. Between the B and the C rolls, the film was CD stretched at a draw ratio of about 1.75 to 1.

The nominal properties of the two ply film thus produced were as follows:

| (1) | Gauge (mils × 100) | | 75 |
|---|---|---|---|
| (2) | Tensile Strength | MD | 9,200 |
| | at Break (psi) | CD | 4,200 |
| (3) | % Elongation | MD | 210 |
| | at Break | CD | 370 |
| (4) | Yield Strength | | 5,900 |
| | (psi) | | 2,300 |
| (5) | Tensile Modulus | | |
| | (psi) | MD | 36,000 |
| | | CD | 45,000 |
| (6) | % Haze | | 4.2 |
| (7) | % Shrink | | |
| | 150° | MD | 5 |
| | | CD | 5 |
| | 220° | MD | 31 |
| | | CD | 26 |
| (8) | Shrinkforce | MD | 280 |
| | (psi) | CD | 220 |
| (9) | % Gloss | | 74 |
| (10) | Lap Seal Range (°F.) | | 228–248 |
| (11) | Weldotron "L" Seal | | |
| | Range (% Line Voltage) | | 60–100 |
| (12) | L Seal Strength (lbs.) | MD | 6.5 |
| | | CD | 2.5 |
| (13) | "L" Seal Energy | | |
| | (in-lbs.) | MD | 3.7 |
| | | CD | 2.5 |
| (14) | Internal Tear Resistance | MD | 130 |
| | (gms/ply) | CD | 53 |

-continued

| | | |
|---|---|---|
| (15) | Impact Resistance (cm-kg) | |
| | a - 72° F. | 9.5 |
| | b - 32° F. | 8.2 |
| | c - 0° F. | 8.3 |
| (16) | MVTR (gms/100 in² - 24 hrs) | 0.7 |
| (17) | Coefficient of Friction | |
| | Static Out | 0.15 |
| | In | 0.13 |
| | Kinetic Out | 0.25 |
| | In | 0.20 |

While as stated in the examples, the 3:1 blend of Tenite 1810 and Dow X0-61500.42 is the presently preferred polyethylene formulation, but other formulations may also be used. For example, Tenite 1811 (another low density polyethylene made by Eastman Chemical Products, Inc.), or blends of Tenite 1811 and Tenite 1810, e.g. at a weight proportion of 1:2, have given satisfactory results. Gulf PE4523, and a 1.1 by weight blend of Gulf PE4523 and Gulf PE2662 (all products of the Gulf Oil Chemicals Co.), have both been shown to be satisfactory formulations. However, the preferred formulation was found to provide a somewhat stiffer film with better heat seal characteristics while maintaining good clarity.

To evaluate the characteristics of the novel film of this invention, comparisons were made between the single ply film in EXAMPLE 1 (XP-97), the two ply film in EXAMPLE 2 (XP-97-1), and five other polyethylene films: (1) a conventionally blown polyethylene film (CBP-1) blown at a 3.2:1 blow ratio; (2) a second conventionally blown polyethylene film (CBP-2) blown at a 5.7:1 blow ratio; (3) a polyethylene film made by the process of T. A. Loredo in his U.S. Pat. Application Ser. No. 543,998 (XP-78), blown at a 5.7:1 blow ratio; (4) Clysar EH, a polyethylene copolymer film stretched through the point of cold draw; and (5) Cryovac D925, an amorphous irradiated polyethylene film stretched through the point of cold draw. The films (1), (2) and (3) were made using the same formulation as in the examples, and the thickness of all films was about 0.75 mils.

The first property compared was minimum shrink temperature, which was determined as follows.

Internally weighted blocks of pinewood having the approximate dimensions of 6.75"×7.0"×1.5", were used as the packages in all testing, with the long direction of each block being placed parallel to the machine direction of the film for wrapping.

In each test, one of the pinewood blocks was wrapped with a piece of the film to be examined, which was heat sealed with a conventional hot wire impulse sealer (Weldotron Model L20DE). The total size of the piece of film was 18 inches (MD)×17.5 inches (CD), such that about 5.5% MD shrinkage and about 5.7% CD shrinkage would be necessary for a complete conformity of the film to the shape of the block. To allow for the escape of air, the film was punched with three holes at each of the blocks' sides.

The wrapped block was then immersed in a heated bath of Carbowax 400 polyethylene glycol—a product of Union Carbide Corporation. The test was started at a bath temperature of about 180° F. and the block was immersed for about 30 seconds. The temperature was raised in increments of about 10° F. with a freshly wrapped block being immersed for about 30 seconds at each temperature level, until complete shrinkage was obtained. Complete shrinkage was considered to have occurred when there was a total conformity of the film to the shape of the package, with the exception of wrinkles in the seals and minor dog ears at the corners. Once complete shrinkage was obtained, two additional samples were run to verify the results.

The minimum shrink temperatures for the various tested films, together with their associated crystalline salt points appeared as follows:

| Film | Min. Shrink Temp (°F.) | Crystalline Melt Points (°F.) |
|---|---|---|
| XP-97 | 200 | 230–239 |
| XP-97-1 | 190 | 230–239 |
| CBP-1 | 250 | 230–239 |
| CBP-2 | 250 | 230–239 |
| XP-78 | 240 | 230–239 |
| Clysar EH | 190 | 237–262 |
| Cryovac D925 | 210 | (Not Applicable) |

These results can be directly correlated to the actual performance of the tested films when used to wrap articles passed through a hot air shrink tunnel. Where the minimum shrink temperature exceeds the crystalline melt point, shrink tunnel performance is poor. The results also show that the XP-97, the XP-97-1 and the Clysar EH are capable of substantially complete shrinkage at lower temperatures than the other tested films.

The shrink forces, internal tear resistances and heat seal energies of the seven films were also measured and compared. The results appeared as follows:

| Film | Shrink Force (psi) | | Internal Tear Resistance (gm/ply) | | Heat Seal Energy (in-lbs) | |
|---|---|---|---|---|---|---|
| | MD | CD | MD | CD | MD | CD |
| XP-97 | 240 | 90 | 25 | 66 | 4.1 | 3.6 |
| XP-97-1 | 280 | 220 | 130 | 53 | 3.7 | 2.5 |
| CBP-1 | 13 | 0 | 147 | 174 | 2.1 | 3.2 |
| CBP-2 | 0 | 44 | 30 | 30 | 2.7 | 2.8 |
| XP-78 | 18 | 57 | 39 | 42 | 3.2 | 3.0 |
| Clysar EH | 340 | 380 | 8 | 6 | 0.5 | 0.2 |
| Cryovac D925 | 370 | 340 | 5 | 7 | 0.4 | 0.4 |

As can be seen by the above results, the process of this invention is capable of producing a novel mildly biaxially oriented blown polyethylene film characterized by a cross directional shrink force in the range of about 60 to 300 psi, an average heat seal energy of at least about 2.0 in-lbs., an average internal tear resistance of at least about 30 gms/ply, and a minimum shrink temperature no higher than about 220° F. and which is less than its crystalline melt point. (As used herein in reference to the properties of internal tear resistance and heat seal energy, the term "average" means the average of the pertinent MD and CD property values.)

While this invention has been described herein by reference to a limited number of embodiments thereof, it should be understood that such embodiments are purely exemplary and that innumerable variations, modifications and extensions of these embodiments are possible which nevertheless are within the scope of this invention, which is intended to be measured and limited only by the following claims.

What is claimed is:

1. A mildly biaxially oriented, blown polyethylene film characterized by a cross directional shrink force in the range of about 60 to 300 psi, an average heat seal energy of at least about 2.0 in-lbs., an average internal tear resistance of at least about 30 gms/ply, and a minimum shrink temperature no higher than 200° F. and which is less than the crystalline melt point (or points) of the polyethylene.

2. The film of claim 1 wherein the shrink force in the machine direction is in the range of about 200 to 300 psi.

3. A process for producing a heat shrinkable biaxially oriented polyethylene film having a CD shrink force between about 60 and 300 psi and a MD shrink force of 200–300 psi, in accordance with a blown bubble method which comprises the sequential steps of (1) extruding as a continuous tube, molten polyethylene which has a crystalline melt point (or points) between about 220° F. and 270° F., (2) expanding the polyethylene tube cross-directionally at a blow ratio between about 3:1 and 8:1, (3) drawing the polyethylene film machine-directionally at a draw ratio between about 1.2:1 and 2.8:1 at a temperature between about 160° F. and 230° F., (4) drawing the polyethylene film cross-directionally at a draw ratio between about 1.2:1 and 2.5:1 at a temperature between about 160° F. and 230° F. but without applying additional heat, (5) relaxing the film so as to allow an MD shrink back between about 0.7:1 and 1.0:1, (6) heating the polyethylene film to a temperature between about 120° F. and 230° F. and (7) then drawing the polyethylene film machine directionally at a ratio between about 1.1:1 and 1.4:1 to achieve the desired finished film properties.

4. A process in accordance with claim 3 wherein the expanded polyethylene tube from step (2) is converted into layflat dimensions for drawing steps (3) through (7) of the process.

* * * * *